United States Patent

Lettmann et al.

[11] Patent Number: 6,001,424
[45] Date of Patent: Dec. 14, 1999

[54] PROCESS FOR THE PREPARATION OF A TWO-COAT FINISH, AND AQUEOUS COATING MATERIALS

[75] Inventors: Bernd Lettmann; Gerhard Reusmann; Egon Wegner, all of Münster, Germany

[73] Assignee: BASF Lacke + Farben Aktiengesellschaft, Muenster-Hiltrup, Germany

[21] Appl. No.: 08/646,288

[22] PCT Filed: Nov. 18, 1994

[86] PCT No.: PCT/EP94/03824

§ 371 Date: May 16, 1996

§ 102(e) Date: May 16, 1996

[87] PCT Pub. No.: WO95/14721

PCT Pub. Date: Jun. 1, 1995

[30] Foreign Application Priority Data

Nov. 23, 1993 [DE] Germany .............................. 43 39 870

[51] Int. Cl.$^6$ .............................. B05D 1/36; B05D 7/16; C08L 75/04
[52] U.S. Cl. .................. 427/407.1; 524/458; 524/460; 524/461; 524/591
[58] Field of Search .................. 427/407.1, 409; 524/437, 457, 591, 460, 458, 461

[56] References Cited

U.S. PATENT DOCUMENTS

| 4,198,330 | 4/1980 | Kaizerman et al. | 260/29.6 R |
|---|---|---|---|
| 4,318,833 | 3/1982 | Guagliardo | 524/457 |
| 5,169,719 | 12/1992 | Balatan | 427/421 |
| 5,236,995 | 8/1993 | Salatin et al. | 427/402 |
| 5,334,420 | 8/1994 | Hartung et al. | 427/407.1 |
| 5,387,642 | 2/1995 | Blum et al. | 427/372.2 |
| 5,439,710 | 8/1995 | Vogt et al. | 427/407.1 |
| 5,503,939 | 4/1996 | Rink et al. | 427/409 |

FOREIGN PATENT DOCUMENTS

| 0 098 752 A2 | 7/1983 | European Pat. Off. . |
| 0 183 119 A1 | 11/1985 | European Pat. Off. . |
| 0 350 040 A2 | 7/1989 | European Pat. Off. . |
| 0 401 565 A1 | 5/1990 | European Pat. Off. . |
| 0 424 705 A2 | 10/1990 | European Pat. Off. . |
| 0 522 420 A2 | 6/1992 | European Pat. Off. . |
| 40 10 176 A1 | 3/1990 | Germany . |

*Primary Examiner*—Diana Dudash

[57] ABSTRACT

The invention relates to a process for the preparation of a two-coat finish on a substrate surface, in which process a basecoat is employed which contains as binder a polymer which can be obtained by subjecting an ethylenically unsaturated monomer or a mixture of ethylenically unsaturated monomers to free-radical polymerization in an aqueous dispersion of a polyurethane resin which has a number-average molecular weight of from 1000 to 30,000 and contains on average from 0.05 to 1.1 polymerizable double bonds per molecule, and in the presence of a water-insoluble initiator or of a mixture of water-insoluble initiators, the weight ratio of the polyurethane resin to the ethylenically unsaturated monomer or to the mixture of ethylenically unsaturated monomers being between 1:10 and 10:1.

8 Claims, No Drawings

PROCESS FOR THE PREPARATION OF A TWO-COAT FINISH, AND AQUEOUS COATING MATERIALS

BACKGROUND AND SUMMARY OF THE INVENTION

The invention relates to a process for the preparation of a two-coat finish on a substrate surface, in which (1) a pigmented aqueous basecoat is applied to the substrate surface,
(2) a polymer film is formed from the basecoat applied in step (1),
(3) a transparent topcoat is applied to the basecoat obtained in this way, and subsequently
(4) the basecoat and the topcoat are baked together.

The invention also relates to aqueous coating materials which can be employed in this process as pigmented basecoats.

The process described above is employed in particular for the preparation of two-coat automotive finishes of the basecoat/clearcoat type. In this context the quality of the two-coat finish prepared by this process depends quite critically on the aqueous basecoat employed in step (1) of the process.

EP-A-353 797 describes aqueous coating materials which can be employed as basecoats in step (1) of the above-described process. The aqueous coating materials described in EP-A-353 797 contain as binder a polymer which is obtainable by subjecting acrylate and/or methacrylate monomers to an emulsion polymerization which is initiated by water-soluble initiators, in the presence of an anionic polyurethane resin which may also contain vinyl groups.

If the aqueous coating materials described in EP-A-353 797 are employed as basecoats in the above-described process, two-coat finishes are obtained which have an unsatisfactory stability with respect to condensed moisture. This disadvantage manifests itself in particular in refinishes, which are only cured at temperatures up to 80° C. Moreover, the aqueous coating materials described in EP-A-353 797 have an unsatisfactory storage stability if they contain a melamine resin as additional binder component.

EP-A-297 576 describes a process for the preparation of two-coat finishes of the type described above, in which the aqueous coating materials employed as basecoat contain an aqueous polymer dispersion which is obtainable by polymerizing ethylenically unsaturated monomers in an aqueous dispersion in the presence of a polyurethane resin which contains urea groups but no vinyl groups. If the aqueous coating materials described in EP-A-297 576 are employed as basecoats in the above-described process for the preparation of two-coat finishes, then the two-coat finishes obtained are in need of improvement with respect to their resistance to condensed water. Moreover, the aqueous coating materials described in EP-A-297 576 often display deficiencies in storage stability, and defects which can be traced back to instances of incompatibility, if combinations of different binders are employed.

DE-A-40 10 176 describes a process for the preparation of a two-coat finish, in which an aqueous basecoat is employed which contains as binder a polymer which is obtainable by polymerizing ethylenically unsaturated monomers in an organic solvent in the presence of a polyurethane resin which contains polymerizable double bonds and converting the resulting reaction product to an aqueous dispersion. If basecoats which contain metal pigments are employed in the process described in DE-A-40 10 176, the two-coat metallic finishes obtained are in need of improvement with respect to their metallic effect. Moreover, a disadvantage in the preparation of the aqueous basecoats described in DE-A-40 10 176 is that that a large quantity of organic solvents is required.

The object of the present invention was to provide a new process for the preparation of two-coat finishes of the type described above, with which two-coat finishes are obtained whose properties are improved in comparison with the prior art and in which, in particular, the above-described disadvantages of the prior art are absent or lessened.

This object is surprisingly achieved by a process for the preparation of a two-coat finish on a substrate surface, which process consists in going through the steps (1) to (4) described above and is characterized in that the basecoat contains as binder a polymer which can be obtained by subjecting an ethylenically unsaturated monomer or a mixture of ethylenically unsaturated monomers to free-radical polymerization in an aqueous dispersion of a polyurethane resin which has a number-average molecular weight of from 1000 to 30,000 and contains on average from 0.05 to 1.1 polymerizable double bonds per molecule, and in the presence of a water-insoluble initiator or of a mixture of water-insoluble initiators, the weight ratio of the polyurethane resin to the ethylenically unsaturated monomer or to the mixture of ethylenically unsaturated monomers being between 1:10 and 10:1.

In cases where a basecoat is employed which contains metal pigment the two-coat finishes prepared by the process according to the invention exhibit an excellent metallic effect. The adhesion between basecoat and substrate and the adhesion between basecoat and clearcoat is excellent. Moreover, the two-coat finishes prepared by the process according to the invention exhibit a very good resistance to high atmospheric humidity. The aqueous basecoats employed in accordance with the invention are stable on storage and exhibit no defects which can be traced back to incompatibility phenomena, even when combinations of different binders are employed.

DETAILED DESCRIPTION

The aqueous dispersion of the polyurethane resin, in which the ethylenically unsaturated monomer or the mixture of ethylenically unsaturated monomers is subjected to free-radical polymerization in the presence of a water-insoluble initiator or of a mixture of water-insoluble initiators, can be prepared by using, from (a) a polyester- and/or polyether-polyol having a number-average molecular weight of from 400 to 5000 or a mixture of such polyester- and/or polyether-polyols, and
(b) a polyisocyanate or a mixture of polyisocyanates, together if desired with a monoisocyanate or a mixture of monoisocyanates, and
(c) a compound which contains at least one group which is reactive toward isocyanate groups and at least one group which is capable of forming anions in the molecule, or a mixture of such compounds, or
(d) a compound which contains at least one group which is reactive toward NCO groups and at least one poly(oxyalkylene) group in the molecule, or a mixture of such compounds, or
(e) a mixture of components (c) and (d), and
(f) if desired, a compound which contains not only a polymerizable double bond but also at least one group which is reactive toward NCO groups, or a mixture of such compounds, and
(g) if desired, an organic compound which contains hydroxyl and/or amino groups and has a molecular weight from 60 to 399, or a mixture of such compounds, to prepare a polyurethane resin which has a number-average molecular weight of from 1000 to 30,000, preferably from 1500 to 20,000, and contains on average from 0.05 to 1.1, preferably from 0.2 to 0.9, polymerizable double bonds, and by dispersing this resin in water.

The polyurethane resin can be prepared both in bulk and in organic solvents.

The polyurethane resin can be prepared by simultaneous reaction of all the starting compounds. However, in many cases it is advantageous to prepare the polyurethane resin in steps. For example, it is possible to prepare an isocyanato-containing prepolymer from components (a) and (b), which is then reacted further with component (c) or (d) or (e). Furthermore, it is possible to prepare an isocyanato-containing prepolymer from components (a) and (b) and (c) or (d) or (e) and, if desired, (f), which can then be reacted with component (g) to give a higher molecular weight polyurethane resin. The reaction with component (g) may be carried out in bulk or—as described for example in EP-A-297 576—in water. In cases where the compound employed as component (f) contains only one group which is reactive toward isocyanate groups, in a first step an isocyanato-containing precursor can be prepared from (b) and (f), which can subsequently be reacted further with the other components.

The reaction of components (a) to (g) can also be carried out in the presence of catalysts such as, for example, dibutyltin dilaurate, dibutyltin maleate and tertiary amines.

The quantities of component (a), (b), (c), (d), (e), (f) and (g) to be employed are determined by the number-average molecular weight to be aimed for and the acid number to be aimed for. The polymerizable double bonds can be introduced into the polyurethane molecules by employing components (a) which contain polymerizable double bonds and/or components (b) which contain polymerizable double bonds, and/or component (f). It is preferred to introduce the polymerizable double bonds by way of component (f). It is further preferred for the groups which contain polymerizable double bonds and are introduced into the polyurethane resin molecules to be acrylate, methacrylate or allyl ether groups.

As component (a) it is possible to employ saturated and unsaturated polyester- and/or polyether-polyols, especially polyester- and/or polyether-diols having a number-average molecular weight of from 400 to 5000. Examples of suitable polyether-diols are polyether-diols of the general formula $H(-O-(CHR^1)_n-)_mOH$, in which $R^1$ is hydrogen or a lower substituted or unsubstituted alkyl radical, n is 2 to 6, preferably 3 to 4, and m is 2 to 100, preferably 5 to 50. Examples are linear or branched polyether-diols such as poly(oxyethylene) glycols, poly(oxypropylene) glycols and poly(oxybutylene) glycols. The polyether-diols selected should not contribute excessive quantities of ether groups, since otherwise the polymers formed swell in water. The preferred polyether-diols are poly(oxypropylene) glycols in the molecular mass range $M_n$ of from 400 to 3000.

Polyester-diols are prepared by esterification of organic dicarboxylic acids or their anhydrides with organic diols or are derived from a hydroxycarboxylic acid or from a lactone. In order to prepare branched polyester-polyols it is possible to a small extent to employ polyols or polycarboxylic acids of a higher functionality. The dicarboxylic acids and diols may be linear or branched aliphatic, cycloaliphatic or aromatic dicarboxylic acids or diols.

The diols used to prepare the polyesters consist, for example, of alkylene glycols such as ethylene glycol, propylene glycol, butylene glycol, 1,4-butanediol, 1,6-hexanediol, neopentylglycol and other diols such as dimethylolcyclohexane. However, it is also possible to add small quantities of polyols such as trimethylolpropane, glycerol and pentaerythritol. The acid component of the polyester primarily comprises low molecular weight dicarboxylic acids or their anhydrides having from 2 to 44, preferably from 4 to 36, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, provided the latter exist. In the formation of polyester-polyols it is also possible for minor quantities of carboxylic acids having 3 or more carboxyl groups to be present, for example trimellitic anhydride or the adduct of maleic anhydride with unsaturated fatty acids.

It is also possible to employ polyester-diols which are obtained by reacting a lactone with a diol. They are distinguished by the presence of terminal hydroxyl groups and repeating polyester units of the formula $(-CO-(CHR^2)_n-CH_2-O)$. In this formula n is preferably 4 to 6 and the substituent $R^2$=hydrogen or an alkyl, cycloalkyl or alkoxy radical. No substituent contains more than 12 carbon atoms. The total number of carbon atoms in the substituent does not exceed 12 per lactone ring. Examples of such compounds are hydroxycaproic acid, hydroxybutyric acid, hydroxydecanoic acid and/or hydroxystearic acid.

For the preparation of the polyester-diols preference is given to the unsubstituted epsilon-caprolactone, in which n has the value 4 and all substituents $R^2$ are hydrogen. The reaction with lactone is initiated with low molecular weight polyols such as ethylene glycol, 1,3-propanediol, 1,4-butanediol and dimethylolcyclohexane. However, it is also possible to react other reaction components with caprolactone, such as ethylenediamine, alkyldialkanolamines or else urea. Other suitable high molecular weight diols are polylactamdiols, which are prepared by reaction of, for example, epsilon-caprolactam with low molecular weight diols.

If the intention is to introduce polymerizable double bonds into the polyurethane molecules by way of component (a), then components (a) must be employed which contain polymerizable double bonds. Examples of such components (a) are polyester-polyols, preferably polyester-diols, which have been prepared using polyols or polycarboxylic acids which contain polymerizable double bonds, preferably polyols which contain polymerizable double bonds. Examples of polyols which contain polymerizable double bonds are trimethylolpropane monoallyl ether, glycerol monoallyl ether, pentaerythritol monoallyl ether and pentaerythritol diallyl ether.

As component (b) it is possible to employ aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate.

Because of their good resistance to ultraviolet light, (cyclo)aliphatic polyisocyanates give products with a low tendency to yellowing. Examples of cycloaliphatic polyisocyanates are isophorone diisocyanate, cyclopentylene diisocyanate and the hydrogenation products of the aromatic diisocyanates, such as cyclohexylene diisocyanate, methylcyclohexylene diisocyanate and dicyclohexylmethane diisocyanate. Aliphatic diisocyanates are compounds of the formula

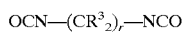

in which r is an integer from 2 to 20, in particular 6 to 8, and $R^3$, which may be identical or different, is hydrogen or a lower alkyl radical of 1 to 8 carbon atoms, preferably 1 or 2 carbon atoms. Examples of such compounds are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. A further example of an aliphatic diisocyanate is tetramethylxylene diisocyanate.

As diisocyanates it is particularly preferred to employ hexamethylene diisocyanate, isophorone diisocyanate, tetramethylxylene diisocyanate and dicyclohexylmethane diisocyanate.

With respect to the functionality of the polyisocyanates, component (b) must have a composition such that no crosslinked polyurethane resin is obtained. In addition to diisocyanates, component (b) may also contain a proportion of polyisocyanates with functionalities of more than two— for example triisocyanates.

Products which have proven suitable as triisocyanates are those formed by trimerization or oligomerization of diisocyanates or by reaction of diisocyanates with polyols or polyamines. Examples of these include the biuret of hexamethylene diisocyanate and water, the isocyanurate of hexamethylene diisocyanate or the adduct of isophorone diisocyanate with trimethylolpropane. If desired, the average functionality can be lowered by addition of monoisocyanates. Examples of such chain-terminating monoisocyanates are phenyl isocyanate, cyclohexyl isocyanate, 1-(1-isocyanato-1-methylethyl)-3-(1-methylethenyl) benzene [sic] and stearyl isocyanate.

To enable the polyurethane resin under discussion to be converted to a stable dispersion in water it must contain hydrophilic groups. These hydrophilic groups are introduced into the polyurethane resin by way of component (c) or component (d) or component (e). The groups of component (c) which are capable of forming anions are neutralized, prior to or during the dispersion of the polyurethane resin in water, with a base, preferably a tertiary amine, for example dimethylethanolamine, triethylamine, tripropylamine and tributylamine, so that the polyurethane resin contains anionic groups after the neutralization. In the case where component (c) is the only component employed which supplies hydrophilic groups, component (c) is employed in a quantity such that the polyurethane resin has an acid number of from 15 to 80, preferably from 20 to 60. In the case where component (d) is the only component employed which supplies hydrophilic groups, component (d) is employed in a quantity such that the polyurethane resin contains from 5 to 40% by weight, preferably from 10 to 30% by weight, of oxyalkylene groups, any oxyalkylene groups introduced by component (a) being included in the calculation. In the case where component (e) is employed as a component which supplies hydrophilic groups, the quantities of component (c) and (d) to be employed in accordance with the mixing ratio are between the values indicated above for the cases where component (c) or (d) is employed as the sole supplier of hydrophilic groups. Besides this, the person skilled in the art can readily determine the quantities of component (c), (d) or (e) to be employed by means of simple routine experiments. All that they have to do is to test, by means of series of simple experiments, how high the proportion of hydrophilic groups must at least be in order to obtain a stable aqueous polyurethane resin dispersion. In addition, they can of course also make use of generally conventional dispersion auxiliaries, for example emulsifiers, in order to stabilize the polyurethane resin dispersions. The use of dispersion auxiliaries, however, is not preferred, since it generally increases the sensitivity to moisture of the finishes obtained.

As component (c) it is preferred to employ compounds which contain two groups in the molecule which are reactive toward isocyanate groups. Suitable groups which are reactive toward isocyanate groups are, in particular, hydroxyl groups, and also primary and/or secondary amino groups. Suitable groups which are capable of forming anions are carboxyl, sulfonic acid and/or phosphonic acid groups, with carboxyl groups being preferred. As component (c) it is possible, for example, to employ alkanoic acids having two substituents on the a carbon atom. The substituent may be a hydroxyl group, an alkyl group or, preferably, an alkylol group. These alkanoic acids have at least one, generally from 1 to 3, carboxyl groups in the molecule. They have from 2 to about 25, preferably from 3 to 10, carbon atoms. Examples of component (c) are dihydroxypropionic acid, dihydroxysuccinic acid and dihydroxybenzoic acid. A particularly preferred group of alkanoic acids are the α,α-dimethylolalkanoic acids of the general formula

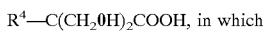

$R^4$ is a hydrogen atom or an alkyl group having up to about 20 carbon atoms.

Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups are α,w-diaminovaleric acid, 3,4-diaminobenzoic acid, 2,4-diaminotoluenesulfonic acid and 2,4-diaminodiphenyl-ether-sulfonic acid.

Using component (d), it is possible to introduce poly (oxyalkylene) groups, as nonionic stabilizing groups, into the polyurethane molecules. Examples of component (d) which can be employed are alkoxypoly(oxyalkylene) alcohols having the general formula R' O—(—$CH_2$—CHR"—O—)$_n$H, in which R' is an alkyl radical having 1 to 6 carbon atoms, R" is a hydrogen atom or an alkyl radical having 1 to 6 carbon atoms and n is a number between 20 and 75.

Component (f) is used for introducing polymerizable double bonds into the polyurethane resin molecules. It is preferred to employ as component (f) a compound which contains at least one group which is reactive toward NCO groups, and a polymerizable double bond. Particular preference is given to the employment, as component (f), of compounds which contain not only a polymerizable double bond but also two groups which are reactive toward NCO groups. Examples of groups which are reactive toward NCO groups are —OH, —SH, >NH and —$NH_2$ groups, with —OH,>NH and $NH_2$ groups being preferred. Examples of compounds which can be employed as component (f) are hydroxy (meth)acrylates, especially hydroxyalkyl (meth) acrylates such as hyroxyethyl, hydroxypropyl, hydroxybutyl or hydroxyhexyl (meth)acrylate and 2,3-dihydroxypropyl (meth)acrylate, 2,3-dihydroxypropyl monoallyl ether, allyl 2,3-dihydroxypropanoate, glycerol mono(meth)acrylate, glycerol monoallyl ether, pentaerythritol mono(meth) acrylate, pentaerythritol di(meth)acrylate, pentaerythritol monoallyl ether, pentaerythritol diallyl ether, trimethylolpropane monoallyl ether, trimethylolpropane mono(meth)acrylate and trimethylolpropane diallyl ether. As component (f) it is preferred to employ trimethylolpropane monoallyl ether, glycerol mono(meth)acrylate, pentaerythritol di(meth)acrylate, pentaerythritol diallyl ether, glycerol monoallyl ether and trimethylolpropane mono(meth)acrylate. As component (f) it is particularly preferred to employ trimethylolpropane monoallyl ether, glycerol monoallyl ether and allyl 2,3-dihydroxypropanoate. It is preferred to incorporate components (f) which contain at least two groups which are reactive toward NCO groups into the polyurethane molecules in chain positions (not terminally).

As component (g) it is possible, for example, to employ polyols having up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentylglycol, neopentylglycol hydroxypivalate, hydroxyethylated or hydroxypropylated bisphenol A, hydrogenated bisphenol A and mixtures thereof. The polyols are generally employed in quantities of up to 30 percent by weight, preferably from 2 to 20 percent by weight, based on the quantity of component (a) and (g) employed.

As component (g) it is also possible to employ di- and/or polyamines containing primary and/or secondary amino groups. Polyamines are primarily alkylene-polyamines having 1 to 40 carbon atoms. They may carry substituents which do not have any hydrogen atoms which are reactive with isocyanate groups. Examples are polyamines having linear or branched, aliphatic, cycloaliphatic or aromatic structure and at least two primary amino groups. Diamines which can be mentioned are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane and aminoethylethanolamine. Preferred diamines are hydrazine, alkyl- or cycloalkyldiamines such as propylenediamines and 1-amino-3-aminomethyl-3,5,5-trimethylcyclohexane. It is also possible to employ as component (g) polyamines which contain more than two amino groups in the molecule. In these cases, however, it should be ensured that—for example by using monoamines as well—that no crosslinked polyurethane resins are obtained. Polyamines of this kind which can be used are diethylenetriamine, triethylenetetramine, dipropylenetriamine and dibutylenetriamine. An example of a monoamine is ethylhexylamine.

The binder present in the basecoats employed in accordance with the invention can be obtained by subjecting an ethylenically unsaturated monomer or a mixture of ethylenically unsaturated monomers to free-radical polymerization in the aqueous polyurethane resin dispersion described above, in the presence of a water-insoluble initiator or of a mixture of water-insoluble initiators, the weight ratio of the polyurethane resin to the ethylenically unsaturated monomer or to the mixture of ethylenically unsaturated monomers being between 1:10 and 10:1, preferably between 1:2 and 2:1.

Ethylenically unsaturated monomers which can be employed are:
(i) aliphatic or cycloaliphatic esters of acrylic acid or methacrylic acid, which contain neither hydroxyl nor carboxyl groups, or a mixture of such esters, and
(ii) ethylenically unsaturated monomers which carry at least one hydroxyl group in the molecule, or a mixture of such monomers, and
(iii) ethylenically unsaturated monomers which carry at least one carboxyl group in the molecule, or a mixture of such monomers, and
(iv) other ethylenically unsaturated monomers, which are different from (i), (ii) and (iii), or a mixture of such monomers, and
(v) polyunsaturated monomers, especially ethylenically polyunsaturated monomers, and mixtures of components (i), (ii), (iii), (iv) and (v).

As ethylenically unsaturated monomers it is preferred to employ mixtures which range from 40 to 100% by weight, preferably from 60 to 90% by weight, of component (i), from 0 to 30% by weight, preferably from 0 to 25% by weight, of component (ii), from 0 to 10% by weight, preferably from 0 to 5% by weight, very particularly preferably 0% by weight of component (iii) and from 0 to 50% by weight, preferably from 0 to 30% by weight of component (iv) and also from 0 to 5% by weight, preferably 0% by weight, of component (v), the sum of the proportions by weight of (i), (ii), (iii), (iv) and (v) always being 100% by weight.

As component (i) it is possible for example to employ cyclohexyl acrylate, cyclohexyl methacrylate, alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate, or mixtures of these monomers.

As component (ii) it is possible for example to employ hydroxyalkyl esters of acrylic acid, methacrylic acid or of another α,β-ethylenically unsaturated carboxylic acid. These esters may be derived from an alkylene glycol which is esterified with the acid, or they may be obtained by reacting the acid with an alkylene oxide. As component (ii) it is preferred to employ hydroxyalkyl esters of acrylic acid and methacrylic acid, in which the hydroxyalkyl group contains up to 6 carbon atoms, or mixtures of these hydroxyalkyl esters. Examples of such hydroxyalkyl esters are 2-hydroxyethyl acrylate, 2-hydroxypropyl acrylate, 2-hydroxypropyl methacrylate, 3-hydroxypropyl acrylate, 3-hydroxypropyl methacrylate, 2-hydroxyethyl methacrylate, 3-hydroxybutyl (meth)acrylate or 4-hydroxybutyl (meth)acrylate. Corresponding esters of other unsaturated acids such as ethacrylic acid, crotonic acid and similar acids having up to about 6 carbon atoms per molecule can also be employed.

As component (iii) it is preferred to employ acrylic acid and/or methacrylic acid. However, it is also possible to employ other ethylenically unsaturated acids having up to 6 carbon atoms in the molecule. Examples of such acids are ethacrylic acid, crotonic acid, maleic acid, fumaric acid and itaconic acid.

As component (iv) it is possible for example to employ aromatic vinyl hydrocarbons, such as styrene, α-alkylstyrene and vinyltoluene, acrylamide and methacrylamide and acrylonitrile and methacrylonitrile, or mixtures of these monomers.

As component (v) it is possible to employ compounds which contain in the molecule at least two double bonds which can be subjected to free-radical polymerization. Examples are divinylbenzene, p-methyldivinylbenzene, o-nonyldivinylbenzene, ethanediol di(meth)acrylate, 1,4-butanediol di(meth)acrylate, 1,6-hexanediol di(meth)acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate, etc.

Examples of water-insoluble initiators which can be employed are water-insoluble azo compounds and water-insoluble peroxy compounds. Examples of water-insoluble azo compounds are 2,2'-azo-bis(isobutyronitrile), 2,2'-azo-bis-(isovaleronitrile), 1,1'-azo-bis-(cyclohexanecarbonitrile) and 2,2'-azo-bis-(2,4-dimethylvaleronitrile). Examples of water-insoluble peroxy compounds are t-amyl peroxyethylhexanoate, t-butyl peroxyethylhexanoate, dilauryl peroxide, dibenzoyl peroxide and 1,1-dimethyl-3-hydroxy-1-butyl peroxyethylhexanoate.

It is of course also possible to add polymerization regulators.

The polymerization of the ethylenically unsaturated monomer or of the mixture of ethylenically unsaturated monomers can be carried out by slowly adding the ethylenically unsaturated monomer or the mixture of ethylenically unsaturated monomers to the aqueous polyurethane resin dispersion. In this case it is possible both to add the entire quantity of monomers in one go and to introduce only a portion as initial charge and meter in the remainder during the reaction. However, the monomers to be polymerized can also be made into a preemulsion using a portion of the polyurethane resin dispersion and water, which preemulsion is then slowly added to the initial charge. The feed time for the monomers to be polymerized is in general 2–8 hours, preferably about 3–4 hours.

The water-insoluble initiators can be added to the initial charge or added dropwise together with the monomers. They can also be added proportionately to the initial charge, which contains a portion of the monomers. The remainder of initiator is then metered in with the rest of the monomers. The reaction temperature is determined by the rate of dissociation of the initiator or initiator mixture and can be reduced, if desired, by means of suitable organic redox systems. The polymerization of the ethylenically unsaturated monomer or of the mixture of ethylenically unsaturated monomers is in general carried out at a temperature of from 30 to 100° C., in particular at a temperature of from 60 to 95° C. If it is carried out at superatmospheric pressure the reaction temperatures may rise to more than 100° C.

The ethylenically unsaturated monomer or the mixture of ethylenically unsaturated monomers should be selected such that the binders obtained in the manner described above have a hydroxyl number of 0–100, preferably 0–80, and an acid number of 10–40, preferably 15–30.

Aqueous binder dispersions prepared in the manner described above can be used by the person skilled in the art to prepare aqueous coating materials which can be employed as basecoats in the above-described process for the preparation of two-coat finishes. In this context it is irrelevant whether the process concerned is a process for the production-line preparation of a two-coat finish or is a process for the preparation of a two-coat finish for repair purposes.

In step (3) of the process described above it is possible in principle to use any transparent topcoats which are suitable for this process, for example conventional transparent topcoats based on organic solvents, aqueous transparent topcoats or transparent powder coatings.

The aqueous basecoats employed in accordance with the invention may also contain, in addition to the binder employed in accordance with the invention, other water-dilutable synthetic resins such as, for example, amino resins, polyurethane resins, polyacrylate resins, polyester resins, etc. A particular advantage of the aqueous basecoats employed in accordance with the invention is that the binder employed in accordance with the invention is readily compatible with numerous additionally employed binders, for example amino resins and polyester resins.

Pigments which may be present in the basecoats employed in accordance with the invention are color pigments based on inorganic compounds, for example titanium dioxide, iron oxide, carbon black, etc., color pigments based on organic compounds, and conventional metallic pigments (e.g. commercially available aluminum bronzes, stainless-steel bronzes . . . ) and nonmetallic effect pigments (e.g. pearl luster or interference pigments). The level of pigmentation is within conventional ranges. The basecoats according to the invention preferably contain at least one metallic pigment and/or one nonmetallic effect pigment.

Using the aqueous coating materials according to the invention it is also possible to prepare high-quality finishes without applying a transparent topcoat on top.

The aqueous coating materials according to the invention can be applied to any desired substrates, examples being metal, wood, plastic or paper. Application may be made directly or, as is conventional in the automotive industry, following application of an electrodeposition primer and a filler.

The aqueous coating materials according to the invention can be applied by spraying, knife coating, dipping, rolling, and preferably by electrostatic and pneumatic spraying. In the Examples which follow the invention is illustrated in more detail. All percentages and parts are by weight unless expressly stated otherwise.

1. Preparation of a Binder Dispersion According to the Invention 178.5 g of a linear polyester (composed of dimerized fatty acid (Pripol® 1013), isophthalic acid and 1,6-hexanediol) having a hydroxyl number of 80 and a number-average molecular weight of 400 are dissolved, after addition of 20.8 g of dimethylolpropionic acid and 7.4 g of trimethylolpropane monoallyl ether, in 44.6 g of N-methylpyrrolidone and 80.9 g of methyl ethyl ketone in a reaction vessel with stirrer, internal thermometer, reflux condenser and electrical heating. 90.7 g of isophorone diisocyanate are then added at 45° C. After the exothermic reaction has subsided the mixture is slowly heated to 80° C. It is maintained at this temperature until the NCO content is 1.8%. It is then cooled to 50° C., and 14.9 g of triethylamine and 535.3 g of deionized water are added in rapid succession. After 15 minutes a mixture of 7.6 g of aminoethylethanolamine and 19.3 g of deionized water are added to the well-dispersed resin. The temperature is subsequently raised to 60° C. and the methyl ethyl ketone is distilled off in vacuo. The resulting dispersion has a solids content of 34.3% by weight (60 min at 130° C.) and a pH of 8.0.

514.7 g of the polyurethane resin dispersion prepared above are diluted with 277.7 g of deionized water. The solution is heated to 85° C. and then a mixture of 50.1 g of styrene, 50.1 g of methyl methacrylate, 37.5 g of n-butyl acrylate and 37.5 g of hydroxyethyl methacrylate is added slowly over the course of 3.5 hours. Commencing with the addition of this mixture, a solution of 2.6 g of t-butyl peroxyethylhexanoate in 30 g of methoxypropanol is added over the course of 4 hours. Subsequently the mixture is maintained at 85° C. until the monomers have reacted completely. Additional initiator is added if desired. Finally any coagulated material which may have been produced is filtered off. The weight ratio of polyurethane resin to acrylate monomers is 1:1. The resulting dispersion displays a very good stability on storage and has a solids content of 34.8% by weight (60 min at 130° C.) and a pH of 7.2.

2. Preparation of a Basecoat According to the Invention 2.1 Preparation of a Pigment Paste A paste is made from 40 g of a commercially available aluminum bronze (aluminum content: 65%) together with a mixture of 10 g of water, 10 g of butoxyethanol, 15 g of a commercially available hexamethoxymethylmelamine resin and 70 g of a 31% by weight strength polyurethane resin dispersion prepared in accordance with the teaching of WO 92/15405.

2.2 Preparation of the Basecoat 306 g of the binder dispersion prepared according to Section 1. are mixed while stirring with 5 g of N-methylmorpholine and 79 g of butoxyethanol.

Then 250 g of a 3% strength commercially available thickener solution based on a polyacrylate dispersion are added with stirring and the mixture is adjusted to a pH of between 7.3 and 7.6 with N-methylmorpholine. The pigment paste prepared according to Section 2.1 is then added slowing with stirring. Thereafter 143 g of water are added slowly with stirring (about 800 rpm). Finally the mixture is adjusted with water to a spray viscosity of 30 s in accordance with DIN 53211.

3. Preparation of a Two-Coat Finish using a Basecoat According to the Invention

The basecoat prepared in accordance with Section 2.2 is applied, using a flow-cup spray gun, to a bodywork panel coated with a commercially available electrodeposition coating and with a commercially available filler, in such a way that the basecoat film, dried for 5 min at 20° C. and for 10 min at 80° C., has a dry film thickness of about 15 $\mu$m. A commercially available 2-component clearcoat is applied over the basecoat film dried in this way and is baked for 30 min at 130° C. The dry film thickness of the clearcoat is about 40 $\mu$m. The two-coat finish obtained in this way has an excellent metallic effect. A number of tests in accordance with the so-called adhesive-tape tear off method show that both the adhesion between basecoat and clearcoat and the adhesion between filler coat and basecoat is excellent. To test the facility for coating over the finish with a refinish, the basecoat prepared in accordance with Section 2.2 is applied over the baked two-coat finish with a flow-cup spray gun in such a way that the basecoat film, dried for 5 min at 20° C. and for 10 min at 80° C., has a dry film thickness of about 15 $\mu$m. A 2-component clearcoat is then coated over the basecoat film dried in this way and is cured for 30 min at 80° C. The refinish obtained in this way has an excellent metallic effect. After storage for 240 hours at 40° C. and a relative atmospheric humidity of from 95 to 100% the finish, both with and without the refinish coated over it, exhibits no blistering, swelling or matting after a regeneration phase of one hour.

Comparative Experiment

The procedure as described under Sections 1 to 3 is repeated, with the sole exception that, instead of the binder dispersion according to the invention prepared in accordance with Section 1, an equivalent quantity of the binder dispersion described in Example 1 of EP-A-353 797 is employed. The stability to high atmospheric humidity of the resulting finishes ranges from unsatisfactory to completely inadequate.

What is claimed is:

1. A process for the preparation of a two-coat finish on a substrate surface, comprising
   a) providing an aqueous dispersion of a polyurethane resin having hydrophilic groups, the resin having a number-average molecular weight of from 1000 to 30,000 and containing, on average, from 0.05 to 1.1 polymerizable double bonds per molecule;
   b) polymerizing in the aqueous dispersion, and in the presence of at least one water-insoluble initiator, at least one member selected from the group consisting of ethylenically unsaturated monomers and mixtures thereof, to produce a polymer, wherein the weight ratio of polyurethane resin to ethylenically unsaturated monomer is from 1:10 and 10:1;
   c) preparing a pigmented aqueous basecoat containing the polymer of step b) as binder;
   d) applying the pigmented aqueous basecoat to the substrate surface;
   e) forming a polymer film from the basecoat applied in step d);
   f) applying a transparent topcoat to the basecoat and;
   g) baking and curing the basecoat and the topcoat together.

2. A process according to claim 1, wherein the polyurethane resin contains groups having polymerizable double bonds selected from the group consisting of acrylate, methacrylate, allyl ether groups, and mixtures thereof.

3. A process according to claim 1, wherein the polyurethane resin is anionic and has an acid number of from 20 to 60.

4. A process according to claim 1, wherein the ethylenically unsaturated monomers employed are a mixture of
   (i) from 40 to 100% by weight of an aliphatic or cycloaliphatic ester of acrylic acid or methacrylic acid, which contains neither hydroxyl nor carboxyl groups, or of a mixture of such esters,
   (ii) from 0 to 30% by weight of an ethylenically unsaturated monomer which carries at least one hydroxyl group in the molecule, or of a mixture of such monomers,
   (iii) from 0 to 10% by weight of an ethylenically unsaturated monomer which carries at least one carboxyl group in the molecule, or of a mixture of such monomers,
   (iv) from 0 to 50% by weight of an ethylenically unsaturated monomer which is different from (i), (ii) and (iii), or of a mixture of such monomers, and
   (v) from 0 to 5% by weight of an ethylenically polyunsaturated monomer or of a mixture of such monomers, the sum of the proportions by weight of (i), (ii), (iii), (iv) and (v) always being 100% by weight.

5. Aqueous coating material comprising as binder a polymer which is obtained by subjecting a member selected from the group consisting of ethylenically unsaturated monomers and mixtures thereof to free radical polymerization in an aqueous dispersion of a polyurethane resin in the presence of at least one water-insoluble initiator;
   wherein said polyurethane resin has hydrophilic groups and a number-average molecular weight of from 1000 to 30,000 and contains on average from 0.05 to 1.1 polymerizable double bonds per molecule, and
   further wherein the weight ratio of the polyurethane resin to the ethylenically unsaturated monomer or to the mixture of ethylenically unsaturated monomers is between 1:10 and 10:1.

6. Aqueous coating materials according to claim 5, wherein the polyurethane resin contains groups having polymerizable double bonds selected from the group consisting of acrylate, methacrylate, allyl ether groups, and mixtures thereof.

7. Aqueous coating materials according to claim 5 wherein the polyurethane resin is anionic and has an acid number of from 20 to 60.

8. Aqueous coating materials according to claim 5, wherein the ethylenically unsaturated monomers employed are a mixture of (i) from 40 to 100% by weight of an aliphatic or cycloaliphatic ester of acrylic acid or methacrylic acid, which contains neither hydroxyl nor carboxyl groups, or of a mixture of such esters, (ii) from 0 to 30% by weight of an ethylenically unsaturated monomer which carries at least one hydroxyl group in the molecule, or of a mixture of such monomers, (iii) from 0 to 10% by weight of an ethylenically unsaturated monomer which carries at least one carboxyl group in the molecule, or of a mixture of such monomers, (iv) from 0 to 50% by weight of an ethylenically unsaturated monomer which is different from (i), (ii) and (iii), or of a mixture of such monomers, and (v) from 0 to 5% by weight of an ethylenically polyunsaturated monomer or of a mixture of such monomers, the sum of the proportions by weight of (i), (ii), (iii), (iv) and (v) always being 100% by weight.

* * * * *